March 5, 1946.  E. O. WILLOUGHBY  2,395,928

RADIO ALTIMETER

Filed July 17, 1942

INVENTOR
E. O. WILLOUGHBY
BY
J. L. Gearing
ATTORNEY

Patented Mar. 5, 1946

2,395,928

UNITED STATES PATENT OFFICE 2,395,928

RADIO ALTIMETER

Eric Osborne Willoughby, London W. C. 2, England, assignor to International Standard Electric Corporation, New York, N. Y.

Application July 17, 1942, Serial No. 451,347
In Great Britain September 26, 1941

9 Claims. (Cl. 250—1)

The present invention relates to a system for measuring distances by electromagnetic waves, particularly radio altimeters, and is of the kind in which the transmitted frequency is cyclically varied over a range of frequencies (the frequency sweep) and the waves, reflected from the object whose distance from the transmitter is to be determined, for example the earth, are received at the transmitter location. The difference frequency is obtained between the contemporaneous transmitted waves and waves received at the transmitter location after reflection from said object, this difference frequency being a measure of the distance from the transmitter to the reflecting object. As an altimeter for use on aircraft the transmitter is located on the aircraft and the electromagnetic waves are reflected from the earth.

In carrying out the invention in practice a thermionic valve oscillation generator is provided for producing the transmitted waves and the inter-coupled circuits of the thermionic valve for producing the oscillations and the aerial circuit are all substantially and individually tuned to each instantaneous frequency in the sweep to make said circuits particularly sensitive to the waves received after reflection from the distant object, the frequency difference, corresponding to the distance of the reflecting object from the transmitter, being present in the grid and/or plate current and used to operate a frequency counting arrangement or other device for obtaining an indication of the distance.

This tuning of the various circuits also serves another purpose. When the transmitter aerial is used over a large frequency sweep it is more efficient at some frequencies, for instance the middle frequency of the sweep, than for the frequencies at either end of the sweep range of frequencies. The system according to the invention described hereinbefore is equally efficient over the whole frequency sweep range and enables a greater frequency sweep to be utilised than was hitherto possible.

In one practical example to be described hereinafter, the aerial, the anode-grid circuit and the grid-cathode circuit of the oscillator, either of which valve circuits feeds the transmitting aerial, are each substantially tuned at each frequency throughout the frequency sweep. Variable impedances associated with the aerial, the anode-grid interelectrode capacity and the grid-cathode interelectrode capacity are ganged together to effect these tunings simultaneously, and the cathode-grid voltage is obtained by positive feedback in an impedance in the grid lead common to the anode-grid and grid-cathode circuits augmented by that due to the small anode-cathode capacity.

The invention will be better understood from the following description taken in conjunction with the accompanying drawing which shows by way of example one practical embodiment.

Figure 1:
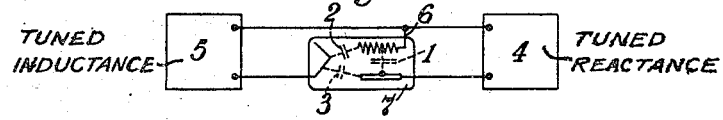
Figure 1 is an explanatory diagram.

The essentials of the circuit at a given frequency can be appreciated from Figure 1 in which 7 represents a thermionic valve oscillation generator wherein 1 is the anode-grid capacity, 2 is the cathode-grid capacity, 3 is the anode-cathode capacity of the valve, 4 indicates a reactance forming with 1 a circuit tuned to the operating frequency, 5 is the impedance of the grid loading circuit which with 2 is also tuned to the operating frequency, and 6 is a grid lead whose impedance provides the feedback voltage.

Figure 2:
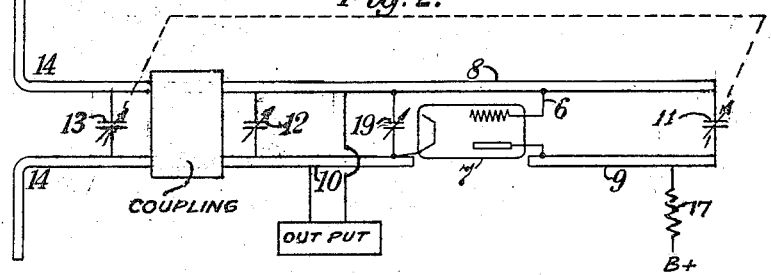
Figures 2 and 3 show schematically practical embodiments.
Figure 3:
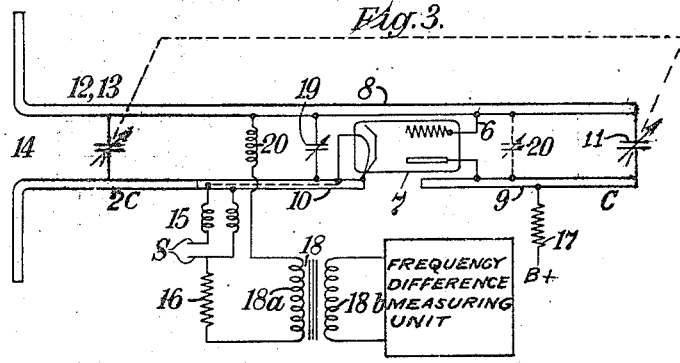

A practical arrangement of the system shown in Figure 1 is indicated diagrammatically in Figure 2, in which 7 is the valve oscillation generator, and in which 8 and 9, and 8 and 10 constitute two two wire transmission lines connected across the grid-anode and grid-cathode terminals of the oscillator respectively. 14 represents the output and aerial transmission line system. 19 is a trimmer condenser provided to balance capacities 1 and 2, (Fig. 1) and will be connected across grid and anode instead of cathode and grid (as shown) when the capacity 1 is less than capacity 2. If increase of operating wave-length is required it will be convenient to provide two trimmer condensers 19 and 20, as shown in Fig. 3.

11, 12 and 13 indicate three variable condensers ganged mechanically together and adjusted to give the same frequency with the respective associated transmission line reactances and capacities.

Condenser 11 controls the frequency of the grid-anode circuit, condenser 12 that of the grid-cathode or input circuit while condenser 13 tunes the aerial circuit to the same frequency as the grid-cathode and grid-anode circuits to a good degree of approximation as will be made clear hereinafter.

The transmission lines may comprise either concentric conductors or low impedance two wire transmission lines; the lower the transmission line impedance $Z_0$ compared to the reactance of the valve interelectrode capacity $C'$ the better will the aerial circuit frequency variation agree with the variation of the other circuits. Results are good, however, if $$\frac{1}{WC'Z_0}$$

is of the order of 2.5—3 or higher ($W=2\pi"f"$ where $f$ is the mean carrier frequency) and adjustment is easier to carry out in practice if the three tunable circuits are screened from each other.

This fact makes the system using concentric conductor transmission lines preferable, and in this case the coupling between the aerial and grid-cathode circuit of the valve can be made by combining 12 and 13 in a composite condenser of twice the size of condenser 11. When concentric lines are used, the outer conductor takes the place of wire 8 shown in Figures 2 and 3 and the inner conductor takes the place of wires 9 and 10 and then the valve 7 is enclosed within the outer conductor. When two wire transmission lines are used the wires may conveniently comprise hollow tubular conductors through which conductors traversed by low frequency or direct current may pass.

In practice it is best to adjust the radiating aerial to a length corresponding to the minimum frequency of the frequency sweep with the characteristic impedance of the transmission line and aerial 14 the same as the characteristic impedance of transmission lines 8, 10 and 8, 9. This adjustment helps to reduce the small divergence from agreement between the aerial circuit and the grid-cathode and grid-anode circuits. The frequency divergence of the aerial circuit when $$\frac{1}{WC'Z_0}=2.8$$

is of the order of ¼% for a frequency sweep of 6% of the mean frequency and of the order of ½% for a frequency sweep of 12% and hence does not appreciably affect the ganging.

The preferred form of the arrangement is indicated in Figure 3, where the two sweep condensers 12 and 13 are combined to form a single condenser.

This type of transmitter unit gives a very wide frequency sweep owing to the effective reaction being maintained at a high value through the full frequency sweep by the ganged tuning arrangement; and by eliminating the transmission line normally used for coupling transmitter and aerial the losses and alignment difficulties of the arrangements hitherto using separate units are removed.

As the difference in frequency with wide frequency sweeps on the high and ultra high frequencies usually employed with this type of distance measuring system, especially with altimeters, is so small a percentage of the transmitted or carrier frequencies even in the extreme ranges of an altimeter, for all practical cases the signal reflected from the object or ground may be regarded as being received by an aerial-oscillator unit which is in tune with it, and there will be in the grid current the difference of frequency between the oscillator frequency and that of the received wave after reflection.

Referring to Figure 3 the filament supplies are fed from a source S through line 19, which is shown as comprising a short length of concentric transmission line, and are taken out through a pair of chokes 15. To the cathode choke is connected the grid leak 16, and the grid current flows through the primary 18a of a low frequency transformer 18, the secondary 18b of which feeds, through amplifiers if necessary, the frequency measuring unit which is arranged to give an indication of the frequency (i. e. the difference frequency of the contemporaneous transmitted wave and the wave received after reflection) or the distance.

17 is the choke and dropping resistance for the H. T. supply.

It should be noted that although supports for the transmission lines are not indicated in the drawing they can be chosen of equal size and arranged at equal distances from the sweep condensers so that they do not affect the ganging of the sweep condensers.

Figure 4A:
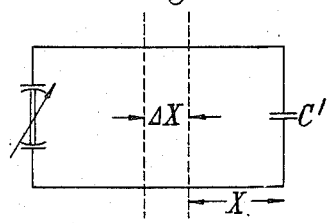
Figures 4a and 4b are explanatory diagrams.
Figure 4B:
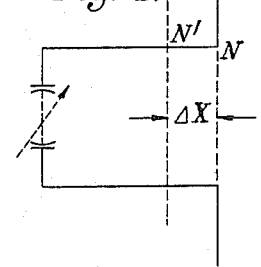
Figure 5:
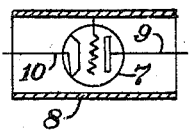

Referring to Figure 4a, this may be taken as representing electrically the grid-cathode or the grid-anode tuned circuit; and to have a ganged aerial circuit it is essential that Figure 4a must be electrically equivalent to Figure 4b which represents the aerial circuit.

N, N' are the positions at $\Delta X$ distance apart and at distance X from the valve oscillator end of the transmission line, of the voltage nodes in the transmission lines corresponding to the maximum and minimum wavelengths of the frequency determining circuits of the oscillator. Referring to Figures 4a and 4b, the requirement for perfect aerial tuning will then be $$\Delta X=\frac{\Delta\lambda}{4}$$

where $\Delta\lambda$ is the difference in wavelength at the maximum and minimum frequencies of the sweep.

Now $$Z_0 \tan \frac{2\pi X}{\lambda}=\frac{1}{WC} \text{ at wavelength } \lambda$$

Therefore $$X=\frac{\lambda}{2\pi} \arctan \frac{1}{WCZ_0}=\frac{\lambda}{2\pi} \arctan \frac{\lambda}{(2\pi VCZ_0)}$$

(V=vel. of light)

Differentiating, $$2\frac{\Delta X}{\Delta\lambda}=\frac{p}{1+p}+\arctan p \qquad (1)$$

where $$p=\frac{\lambda}{2\pi VCZ_0}=\frac{1}{WCZ_0}$$

Now, for proper operation of the ganged condensers, in both Figs. 4a and 4b the condition that $$\frac{\Delta X}{\Delta\lambda}=\frac{1}{4}$$

at centre of sweep should be fulfilled; i. e.

$$\frac{\pi}{2}=\frac{p}{1+p^2}+\arctan p \qquad (2)$$

The solution of this is $p$=infinity; but a very close approximation to the satisfaction of Equation 2 can be obtained when $p$ has a value of 2.5 to 3, such as 2.904. Then $$\frac{p}{1+p^2}+\arctan p=1.547$$

and $$\frac{\pi}{2}=1.571.$$

*Example 1*

Take $Z_0$=100
$C$=1.5 F
$f$=432.5 M. C.
$\Delta f=\mp 12.5$ M. C.

Impedance of $C^1=X_c$
$X_c$=253 ohms $f-\Delta f$=420 M. C. $\lambda$=71.5 cm.
$X_c$=238.2 ohms $f+\Delta f$=445 M. C. $\lambda$=67.4 cm.

$$100 \tan \frac{2\pi X}{\lambda} = 253 \quad \theta = 68.4° \quad X_{max} = 13.6$$

$$100 \tan \frac{2\pi X}{\lambda} = 238.2 \quad \theta = 67.2° \quad X_{min} = 12.6$$

$$\Delta X = 1.00 \text{ cm.}$$

where $$\theta = \frac{2\pi X}{\lambda}$$

but $$\frac{\Delta\lambda}{4} = 1.025 \text{ cm}$$

therefore there is a variance of ¼ mm. If the variance is nil at the mid frequency of the sweep there will be a variance of only ⅛ mm. in a quarter-wavelength of 17.36 cm. at the ends of the sweep.

*Example 2*

Take the case where $f = 432.5$ M. C., and $\Delta f = \mp 25$ M. C.

$X_c = 260$ ohms $\quad f - \Delta f = 407.5$ M. C. $\quad \lambda = 73.65$ cm.

$X_c = 232$ ohms $\quad f + \Delta f = 457.5$ M. C. $\quad \lambda = 65.60$ cm.

$$100 \tan \frac{2\pi X}{\lambda} = 260 \quad \theta = 69.0° \quad X = 14.10$$

$$100 \tan \frac{2\pi X}{\lambda} = 232 \quad \theta = 66.7° \quad X = 12.15$$

$$\Delta X = 1.95 \text{ cm.}$$

but $$\frac{\Delta\lambda}{4} = 2.01 \text{ cm.}$$

Variance $$\frac{\Delta\lambda}{4} - \Delta X = 0.6 \text{ mm.}$$

If the variance is nil at the mid-sweep frequency, the variance amounts to only 0.3 mm. in a quarter wavelength of 17.36 cm.

Hence the ganging arrangement described may be considered acceptable for all practical purposes.

When the system described hereinbefore is used as an altimeter on an aircraft, the transmitter-receiver unit may very conveniently be housed in a casing which supports the aerial and may be streamlined. The output from the secondary winding of the low frequency transformer shown in Figure 3 may, after amplification if desired, be connected by suitable cable to a frequency measuring device located in the body of the aeroplane carrying the transmitter-receiver unit. The frequency measuring device may itself comprise an amplifier in accordance with known practice. The cable may comprise a direct current power line and one capable of carrying the altitude frequency currents, usually less than 100 k. c. This will effect a direct saving in weight of cable over the weight of the radio frequency cable which would otherwise have to be used in a system utilizing individual receiving and transmitting aerials to connect the receiving aerial and transmitter aerials to the separate transmitter and the frequency-converter to the frequency measuring device.

A low pass filter of cut-off frequency just above the maximum altimeter frequency for full scale indication, if inserted, will reduce the extraneous noise level and help to extend the range of the equipment.

Whilst one embodiment of the invention has been described, modifications thereof will occur to those skilled in the art which fall within the scope of the appended claims. In particular, the oscillation generator may be of any known type.

What is claimed is:

1. A system for measuring distance by electromagnetic waves reflected back to the wave source, which comprises a wave generator including a vacuum tube; grid, anode and cathode circuits connected to the tube arranged to produce continuous oscillations; means for continuously cyclically varying the wavelength of said oscillations within a predetermined range, said means comprising variable tuning elements in at least two of said circuits and means for simultaneously actuating said tuning elements and means for producing feedback from the anode circuit to the grid circuit, said means comprising impedance in the grid lead common to the grid and anode circuits augmented by the anode-cathode capacity.

2. A system as set forth in claim 1, in which the tuning elements are ganged variable condensers.

3. A system as set forth in claim 1, in which the wave generator is coupled to an antenna circuit and a single tuning element is used for tuning both the antenna circuit and the associated tube electrode circuit.

4. A system as set forth in claim 1, in which said tube likewise operates as the detector tube for the reflected waves.

5. A system as set forth in claim 1, in which said tube functions also as a detector of the reflected waves, and which includes a low frequency output circuit connected to the oscillation output tube electrode circuit.

6. A system as set forth in claim 1, in which the tube functions as a detector of the reflected waves, and which includes a low frequency transformer having a primary connected to the oscillation output tube electrode circuit, the transformer secondary being adapted for coupling to a frequency measuring device.

7. A system for measuring distance by high frequency electromagnetic waves reflected back to the wave source, comprising a wave generator including a vacuum tube, a cathode-grid tube circuit arranged for connection to an antenna and including a grid impedance, and a grid-anode tube circuit including an anode reactance, said circuits including a straight grid lead extending from an antenna connection point to a grid connection point immediately adjacent the tube and thence to a plate reactance connection point, a straight cathode lead parallel to said grid lead extending from an antenna coupling point to a cathode connection point immediately adjacent the tube, and a straight anode lead parallel to said grid lead extending from an anode reactance connection to an anode connection immediately adjacent the tube.

8. A system as set forth in claim 7, including variable condensers connected across the grid and cathode leads and across the grid and anode leads respectively.

9. A system as set forth in claim 7, in which the grid lead is in the form of a tubular conductor enclosing a vacuum tube, and the cathode and plate leads are axially located within said conductor.

ERIC OSBORNE WILLOUGHBY.